(12) United States Patent
Okamoto et al.

(10) Patent No.: US 9,621,799 B2
(45) Date of Patent: Apr. 11, 2017

(54) IMAGING APPARATUS (71) Applicant: Panasonic Corporation, Osaka (JP)

(72) Inventors: Katsunori Okamoto, Osaka (JP); Tatsuya Tanigawa, Osaka (JP); Daisuke Hirashima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 226 days.

(21) Appl. No.: 14/109,411

(22) Filed: Dec. 17, 2013

(65) Prior Publication Data

US 2014/0104377 A1    Apr. 17, 2014

Related U.S. Application Data

(63) Continuation of application No. PCT/JP2012/005302, filed on Aug. 24, 2012.

(30) Foreign Application Priority Data

Aug. 30, 2011 (JP) ................................. 2011-187203

(51) Int. Cl.
*H04N 5/232* (2006.01)
*G03B 37/02* (2006.01)
*G03B 17/20* (2006.01)

(52) U.S. Cl.
CPC ......... *H04N 5/23238* (2013.01); *G03B 37/02* (2013.01); *H04N 5/23251* (2013.01); *H04N 5/23293* (2013.01); *G03B 17/20* (2013.01)

(58) Field of Classification Search
CPC .... G03B 17/20; G03B 37/02; H04N 5/23238; H04N 5/23251; H04N 5/23293

(Continued)

(56) References Cited

U.S. PATENT DOCUMENTS 5,831,619 A * 11/1998 Nakagawa ................ G06T 1/60
345/419
6,466,701 B1    10/2002 Ejiri et al.
(Continued)

FOREIGN PATENT DOCUMENTS

JP    2000-101895 A    4/2000
JP    2005-223905 A    8/2005
(Continued)

OTHER PUBLICATIONS

Moon et al, Implementation of an Image Stabilization System for a small Digital Camera, May 2008.*
(Continued)

*Primary Examiner* — Shan Elahi
(74) *Attorney, Agent, or Firm* — Renner, Otto, Boisselle & Sklar, LLP (57) ABSTRACT

An imaging apparatus includes a first detector configured to detect an elapsed time after starting to shoot an image in a specific shooting mode for shooting the image by moving the imaging apparatus in a predetermined shooting direction, a second detector configured to detect amount of movement of the imaging apparatus, and a controller configured to control display of a display unit to display, in the specific shooting mode, a first indicator fixedly positioned on the display unit and a second indicator movably positioned on the display unit. The controller decides a first amount of movement in the predetermined shooting direction according to the detected elapsed time and a second amount of movement in an opposite direction according to the detected amount of movement of the imaging apparatus, and controls a display position of the second indicator based on the first and second amounts of movement.

6 Claims, 9 Drawing Sheets

(58) Field of Classification Search
USPC .......................................................... 348/36
See application file for complete search history.

(56) References Cited

U.S. PATENT DOCUMENTS

| | | | | | |
|---|---|---|---|---|---|
| 7,199,829 | B2* | 4/2007 | Matsui | ................. | H04N 1/6011 348/333.02 |
| 7,394,565 | B2* | 7/2008 | Stokes | ................. | H04N 1/6058 358/1.9 |
| 7,656,429 | B2 | 2/2010 | Larson | | |
| 7,755,693 | B2* | 7/2010 | Iwauchi | ............. | H04N 5/23293 348/333.09 |
| 8,077,213 | B2 | 12/2011 | Gulliksson | | |
| 8,676,047 | B2* | 3/2014 | Ueyama | .................. | G01C 9/08 348/333.02 |
| 8,687,091 | B2* | 4/2014 | Haikin | ..................... | H04N 5/77 348/231.6 |
| 9,031,394 | B2* | 5/2015 | Ueyama | .................. | G01C 9/08 348/333.02 |
| 2002/0001036 | A1* | 1/2002 | Kinjo | ................... | H04N 1/3872 348/231.99 |
| 2002/0003579 | A1* | 1/2002 | Inagaki | .................. | H04N 5/232 348/312 |
| 2004/0174386 | A1* | 9/2004 | Kotake et al. | ................. | 345/633 |
| 2005/0089212 | A1* | 4/2005 | Mashitani et al. | ............ | 382/154 |
| 2005/0168594 | A1 | 8/2005 | Larson | | |
| 2005/0212909 | A1* | 9/2005 | Takehara et al. | ................ | 348/36 |
| 2007/0025723 | A1* | 2/2007 | Baudisch | ............... | G03B 13/02 396/287 |
| 2007/0052712 | A1* | 3/2007 | Saito et al. | .................... | 345/473 |
| 2007/0222883 | A1* | 9/2007 | Iwauchi | ............. | H04N 5/23293 348/333.01 |
| 2008/0018668 | A1* | 1/2008 | Yamauchi | ..................... | 345/633 |
| 2008/0088699 | A1* | 4/2008 | Fujita | ............................... | 348/36 |
| 2008/0152258 | A1* | 6/2008 | Tulkki | ........................... | 382/284 |
| 2008/0180550 | A1 | 7/2008 | Gulliksson | | |
| 2008/0211902 | A1* | 9/2008 | Ayaki | ................ | H04N 5/232 348/36 |
| 2008/0253687 | A1* | 10/2008 | Zhang | ................ | H04N 5/23232 382/284 |
| 2010/0073492 | A1* | 3/2010 | Kudo | ........................ | 348/208.1 |
| 2010/0110072 | A1* | 5/2010 | Nakayama | .................... | 345/419 |
| 2010/0149377 | A1* | 6/2010 | Shintani | ................. | H04N 5/232 348/231.5 |
| 2010/0165075 | A1* | 7/2010 | Chou | ................. | H04N 5/23216 348/36 |
| 2011/0090217 | A1* | 4/2011 | Mashitani | .......... | H04N 13/0296 345/419 |
| 2011/0102428 | A1* | 5/2011 | Mashitani et al. | ............ | 345/419 |
| 2011/0103680 | A1* | 5/2011 | Mashitani et al. | ............ | 382/154 |
| 2011/0141228 | A1* | 6/2011 | Shimada | ................ | G03B 37/00 348/36 |
| 2011/0234881 | A1* | 9/2011 | Wakabayashi | ....... | H04N 5/2251 348/333.05 |
| 2012/0027390 | A1* | 2/2012 | Ueyama | .................. | G01C 9/08 396/50 |
| 2012/0105678 | A1* | 5/2012 | Haikin | ..................... | H04N 5/77 348/231.99 |
| 2015/0116453 | A1* | 4/2015 | Hirata et al. | ..................... | 348/38 |
| 2015/0145952 | A1* | 5/2015 | Hirata et al. | .................... | 348/38 |
| 2015/0162048 | A1* | 6/2015 | Hirata et al. | | |
| 2016/0080603 | A1* | 3/2016 | Miyake | .............. | H04N 1/32352 358/3.28 |

FOREIGN PATENT DOCUMENTS

| | | |
|---|---|---|
| JP | 2008-504758 A | 2/2008 |
| JP | 2008-252934 A | 10/2008 |
| JP | 2009-060278 A | 3/2009 |
| JP | 2009-278350 A | 11/2009 |
| JP | 2010-220002 A | 9/2010 |
| JP | 2006-020111 A | 1/2011 |
| JP | 2011-193286 A | 9/2011 |

OTHER PUBLICATIONS

International Search Report for corresponding International Application No. PCT/JP2012/005302 mailed Nov. 13, 2012.
Form PCT/ISA/237 for corresponding International Application No. PCT/JP2012/005302 dated Nov. 13, 2012.
International Preliminary Report on Patentability for corresponding International Application No. PCT/JP2012/005302 mailed Mar. 13, 2014.
English translation of Chinese Search Report dated Apr. 21, 2016 for corresponding Chinese Application No. 201280032182.X.

* cited by examiner

INTERSECTION POINT
(CORRESPONDING TO CENTER POSITION OF OPTICAL AXIS)

IMAGING APPARATUS

BACKGROUND

1. Technical Field

The present disclosure relates to an imaging apparatus which controls display contents in a shooting mode.

2. Related Art

Imaging apparatuses having a panoramic shooting mode have come into use. For example, JP 2006-20111 A discloses a camera which captures a plurality of images and generates a panoramic image from the plurality of captured images. The camera disclosed in JP 2006-20111 A displays a shooting frame indicating a shooting range of a previously captured image and the shooting frame indicating the shooting range of an image to be captured at the same time. That configuration facilitates positioning in shooting a panoramic image and enables appropriate panoramic shooting.

In general, a photographer takes a panoramic image of surrounding landscape by horizontally moving the arms holding the camera or by changing the orientation of the body. In the case where the photographer moves the camera too fast or too slow, the photographer may fail in taking an appropriate panoramic image.

SUMMARY

The present disclosure provides an imaging apparatus which facilitates operation on a camera for appropriate panoramic shooting.

The imaging apparatus of the present disclosure is an imaging apparatus which has a specific shooting mode for shooting an image by moving the imaging apparatus in a predetermined shooting direction. The imaging apparatus includes an imaging unit configured to capture a subject image to generate image data; a display unit configured to display an image based on the generated image data; a first detector configured to detect an elapsed time after shooting of the image is started in the specific shooting mode; a second detector configured to detect amount of movement of the imaging apparatus; and a controller configured to control display of the display unit to display, on the display unit in the specific shooting mode, a first indicator fixedly positioned on the display unit and a second indicator movably positioned on the display unit. The controller decides a first amount of movement in the predetermined shooting direction according to the detected elapsed time and a second amount of movement in a direction opposite to the predetermined shooting direction according to the detected amount of movement of the imaging apparatus, and controls a display position of the second indicator based on the first and second amounts of movement.

According to the present disclosure, an imaging apparatus which facilitates operation for appropriate panoramic shooting can be provided.

DETAILED DESCRIPTION OF PREFERRED EMBODIMENTS

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant. The inventor(s) provide the attached drawings and the following description for those skilled in the art to fully understand the present disclosure and does not intend to limit the subject described in the claims by the attached drawings and the following description.

First Embodiment

An example in which the idea of the present embodiment is applied to a digital camera will be described. The digital camera has a panoramic shooting mode for shooting a panoramic image by moving the digital camera in a predetermined shooting direction. The digital camera includes a CMOS image sensor which captures a subject image and generates image data, a liquid crystal display which displays an image based on the image data generated by the CMOS image sensor, a controller which detects an elapsed time after shooting of an image is started in the panoramic shooting mode, a gyro sensor which detects information on movement of the digital camera, and a controller which controls display of the liquid crystal display so that a fixed frame (a first indicator) fixedly displayed on the liquid crystal display and a target (a second indicator which indicates a moving speed (or an amount of movement) in a turning operation or the like) are displayed on the liquid crystal display in the panoramic shooting mode. The controller decides a first amount of movement in a panoramic shooting direction according to the elapsed time detected by the controller while deciding a second amount of movement in a direction opposite to the panoramic shooting direction according to the amount of movement of the digital camera detected by the gyro sensor, and controls a display position of the target based on the first and second amounts of movement. That allows a photographer to more easily perform an operation for realizing appropriate panoramic shooting.

In the digital camera according to the first embodiment, the panoramic shooting is started based on the detection result of the gyro sensor. Further, the panoramic shooting direction is decided based on the detection result of the gyro sensor. That allows the user to perform intuitive operation for the panoramic shooting and facilitates the operation on the digital camera. The configuration and operation of the digital camera will be described in order below.

[1-1. Configuration]

The configuration of the digital camera of the present embodiment will be described with reference to the drawings.

Figure 1:
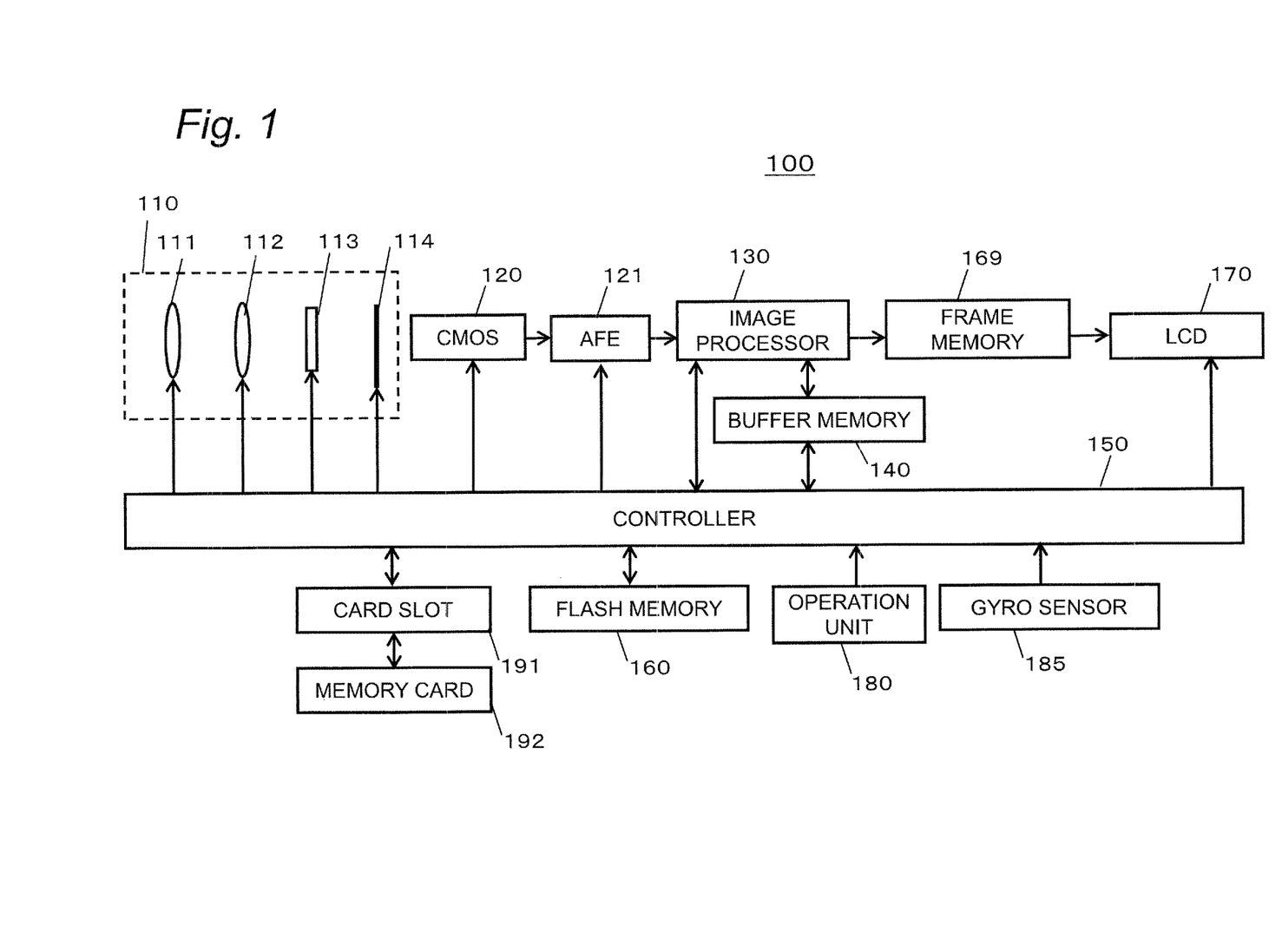
FIG. 1 is a block diagram of a digital camera of a first embodiment.

FIG. 1 is a block diagram illustrating the configuration of the digital camera. In a digital camera 100, a subject image is formed by an optical system 110 and is captured by a CMOS image sensor 120. The CMOS image sensor 120 generates image data based on the captured subject image. The image data generated by the capturing is subjected to various types of processing in an AFE (AFE: Analog Front End) 121 and an image processor 130. The image data is stored in a flash memory 160 or a memory card 192. The image data stored in the flash memory 160 or the memory card 192 is expanded in a frame memory 169 and reproduced on a liquid crystal display 170 in response to an operation performed by a user on an operation unit 180. Further, the image data captured by the CMOS image sensor 120 and then output from the image processor 130 is displayed on the liquid crystal display 170 as a through image.

The optical system 110 includes a focus lens 111, a zoom lens 112, a diaphragm 113, and a shutter 114. Although not illustrated in the diagram, the optical system 110 may include an Optical Image Stabilizer (OIS). The optical system 110 may include any number of lenses of various types or any number of lens groups of various types.

The focus lens 111 is used for adjusting a focal distance. The zoom lens 112 is used for adjusting a magnification/reduction rate of a subject image. The diaphragm 113 is used for adjusting a light quantity incident on the CMOS image sensor. The shutter 114 adjusts an exposure time of light incident on the CMOS image sensor. The focus lens 111, the zoom lens 112, the diaphragm 113, and the shutter 114 are driven by corresponding drivers (not shown) such as a DC motor and a stepping motor according to control signals notified from a controller 150.

The CMOS image sensor 120 captures a subject image formed by the optical system 110 and generates image data. The CMOS image sensor 120 generates a new frame of image data at a predetermined frame rate (for example, 30 frames/second). Timing of generating the image data and an electronic shutter operation of the CMOS image sensor 120 are controlled by the controller 150. With the image data successively displayed on the liquid crystal display 170 as the through image, the user can confirm the state of the subject on the liquid crystal display 170 in real time. In the present disclosure, another imaging device such as a CCD image sensor or an NMOS image sensor may be used in place of the CMOS image sensor 120.

The AFE 121 performs processing such as correlated double sampling and gain control for the image data generated by the CMOS image sensor 120. Further, the AFE 121 converts analog image data to digital image data. Then, the AFE 121 outputs the image data to the image processor 130.

The image processor 130 performs various types of processing for the image data. The various types of processing include, but not limited to, gamma correction, white balance correction, YC conversion process, electronic zoom process, compression, and expansion. The image processor 130 may be configured with a hardwired electronic circuit or may be configured with a microcomputer or the like which executes a program for performing these types of processing. The image processor 130 may also be made into a single integrated circuit together with the controller 150 and the like.

The liquid crystal display 170 is provided on the back of the digital camera 100. The liquid crystal display 170 displays an image based on the image data processed by the image processor 130. The liquid crystal display 170 displays images such as a through image and a recorded image. The liquid crystal display 170 displays images, which are generated for every certain period of time by the CMOS image sensor 120, as the through image in real time. By viewing the through image displayed on the liquid crystal display 170, the user can shoot an image while confirming the composition of the subject. The recorded image is an image recorded on the memory card 192 or the flash memory 160. The liquid crystal display 170 displays an image based on already recorded image data in response to an operation performed by the user. Besides, the liquid crystal display 170 can display various setting conditions and the like of the digital camera 100. Although a change of design can be made as required with respect to the numbers of vertical and horizontal dots which the liquid crystal display 170 can display, it is assumed that the number of vertical dots is 405 and the number of horizontal dots is 720 in the first embodiment, for convenience of description. Also, although a change of design can be made as required with respect to the viewing angle of an image which the liquid crystal display 170 displays, it is assumed that the viewing angle is 120 degrees in the present embodiment, for convenience of description.

In the shooting mode, the image data (the through image) processed by the image processor 130 is expanded in the frame memory 169. Alternatively, in the reproduction mode, the image data (the recorded image) recorded on the memory card 192 is expanded in the frame memory 169. The image data expanded in the frame memory 169 is displayed on the liquid crystal display 170.

The controller 150 performs integrated control over the operation of the entire digital camera 100. The controller 150 notifies control signals to the CMOS image sensor 120, the image processor 130, and the like based on a vertical synchronizing signal (VD). The controller 150 includes components such as a ROM (not shown) which stores information including a program and the like, and a CPU (not shown) which processes information including a program and the like. The ROM stores programs related to autofocus control and auto-exposure control as well as programs for performing integrated control over the operation of the entire digital camera 100.

The controller 150 may be made of a hardwired electronic circuit, or may be made of a microcomputer or the like. The controller 150 may also be made into a single integrated circuit together with the image processor 130 and the like. The ROM needs not to be provided inside the controller 150 and may be provided outside the controller 150.

A buffer memory 140 is a storage unit which functions as a work memory for the image processor 130 or the controller 150. The buffer memory 140 can be implemented by a DRAM (Dynamic Random Access Memory) or the like.

The flash memory 160 functions as an internal memory for storing image data and the like. The controller 150 stores the image data to be processed by the image processor 130 in the flash memory 160 or the memory card 192.

The gyro sensor 185 detects shake in the yawing direction and movement in the pitching direction based on an angular change per unit time, i.e., an angular velocity of the digital camera 100. The gyro sensor 185 outputs a gyro signal indicating a detected amount of movement to the controller 150.

The card slot 191 is a connecting unit to which the removable memory card 192 can be connected. The memory card 192 can be electrically and mechanically connected to the card slot 191. The card slot 191 may also be provided with a function of controlling the memory card 192.

The memory card 192 is an external memory provided with a storage unit such as a flash memory inside. The memory card 192 can store data such as the image data to be processed by the image processor 130. Although the memory card 192 is shown as an example of external memory in the present embodiment, the external memory may be a storage medium such as an optical disk, an HDD or the like.

Figure 2:
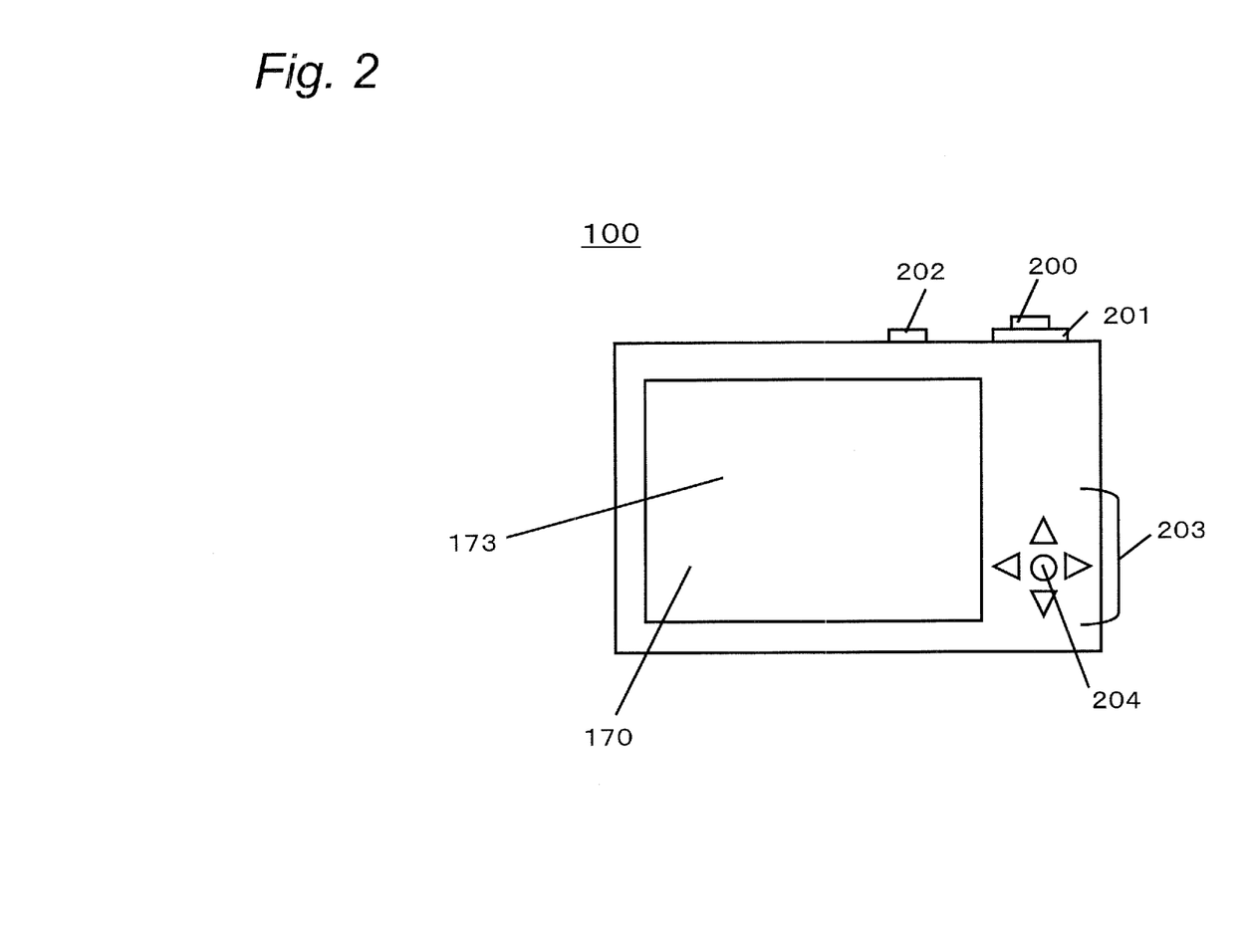
FIG. 2 is a rear view of the digital camera of the first embodiment.

The operation unit 180 is a collective name of a button, a lever, a dial and the like provided on the exterior of the digital camera 100 and accepts an operation performed by a user. For example, as illustrated in FIG. 2, a release button 200, a zoom lever 201, selection buttons 203, a decision button 204, a power button 202 and the like are the operation unit 180. When the operation unit 180 accepts an operation performed by the user, it notifies the controller 150 of the respective operation instructing signals.

The release button 200 is a push button. In response to a half-press operation of the release button 200 by the user, the controller 150 performs the autofocus control, the auto-exposure control, and the like. In the ordinary shooting mode, when the release button 200 is pressed, the controller 150 records, as the recorded image, the image data captured in the timing of the press operation onto the memory card 192 or the like. In the panoramic shooting mode, when the release button 200 is pressed, the controller 150 displays a target 260 which serves as an indicator for indicating the moving speed (or an amount of movement) in a turning operation on the liquid crystal display 170 instead of immediately starting to record of the image data as described later.

The zoom lever 201 automatically returns to its neutral position between the wide-angle end and telephoto end for adjusting the angle of view. When the zoom lever 201 is operated by the user, the zoom lever 201 notifies the controller 150 of an operation instructing signal for driving the zoom lens 112.

The power button 202 is a push button for switching ON/OFF the power supply for the respective components of the digital camera 100. When the power button 202 is pressed by the user in the power OFF state, the controller 150 supplies power to the respective components of the digital camera 100 to activate them. When the power button 202 is pressed by the user in the power ON state, the controller 150 stops supplying power to the respective components.

The selection buttons 203 are push buttons arranged in the upward/downward/leftward/rightward directions. By pressing any one direction of the selection buttons 203, the user can select one of the various conditional items displayed on the liquid crystal display 170.

The decision button 204 is a push button. When the decision button 204 is pressed by the user while the digital camera 100 is in the shooting mode or the reproduction mode, the controller 150 displays a menu screen on the liquid crystal display 170. The menu screen is for the user to set various conditions for shooting/reproducing. When the various conditional setting items are selected and the decision button 204 is pressed, the controller 150 establishes the settings of the selected items.

The digital camera 100 according to the first embodiment has the panoramic shooting mode. By operating the selection buttons 203 and the decision button 204 while viewing the menu screen displayed on the liquid crystal display 170, the user can select and set a shooting mode such as the ordinary shooting mode or the panoramic shooting mode. Meanwhile, setting of a shooting mode by operating the selection buttons 203 and the decision button 204 while viewing the menu screen is merely an example, and a mode setting dial for setting one of a plurality of shooting modes or a dedicated button for directly specifying the panoramic shooting mode may be additionally provided for the operation unit 180.

[1-2. Operation]

Figure 3:
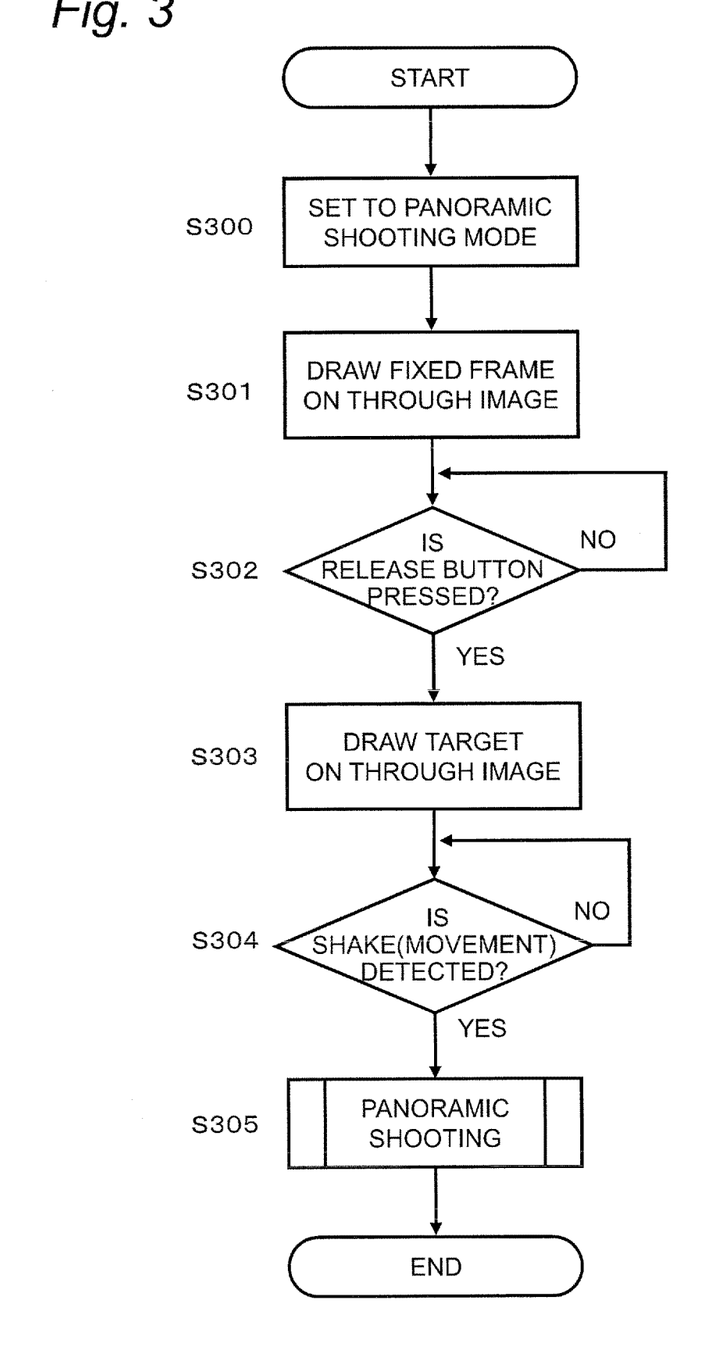
FIG. 3 is a flow chart describing an entire operation of a panoramic shooting mode in the first embodiment.
Figure 4A:
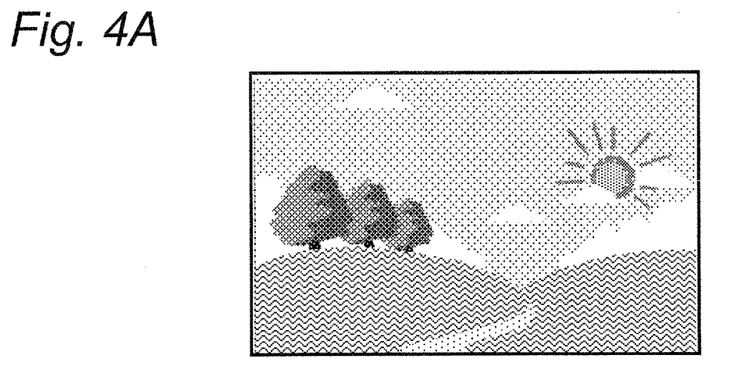
FIGS. 4A, 4B and 4C are diagrams illustrating an example of screen display in the panoramic shooting mode in the first embodiment.
Figure 4B:
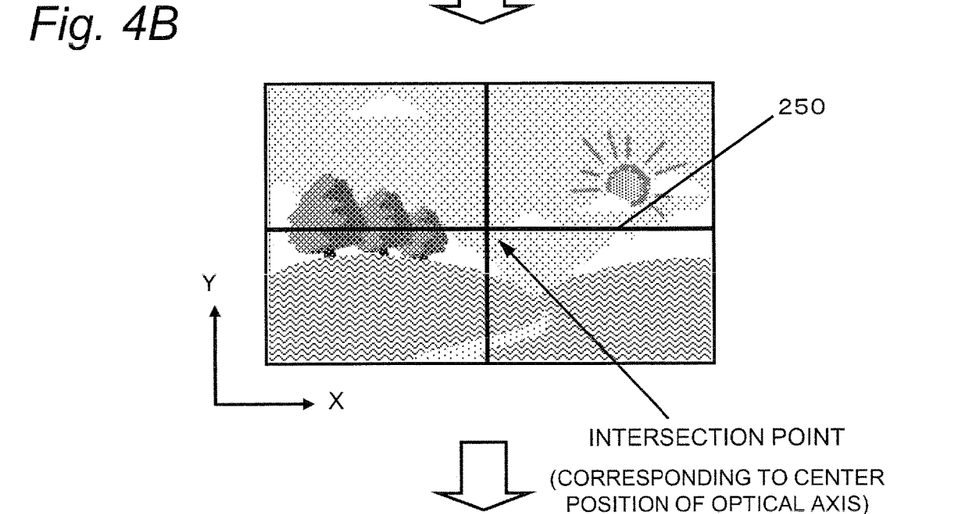
Figure 4C:
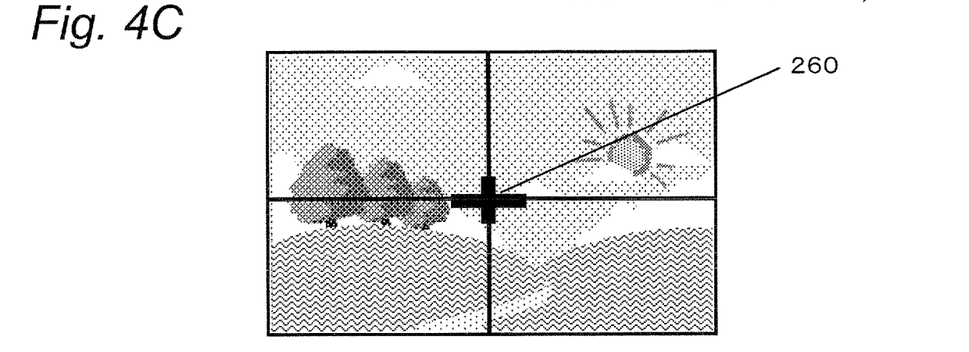

The operation of the digital camera 100 according to the first embodiment will be described with reference to FIG. 3 and FIGS. 4A to 4C. FIG. 3 is a flow chart describing an entire operation of the panoramic shooting mode in the first embodiment. FIGS. 4A to 4C are figures illustrating a screen display in the panoramic shooting mode according to the first embodiment.

In the first embodiment, the user performs the panoramic shooting by turning the digital camera 100 by 90 degrees around the position where the user is standing. In addition, in the first embodiment, it is assumed that the shooting time required for acquiring an appropriate panoramic shot image is 1 second in the case where the user shoots the image by turning the digital camera 100 by 90 degrees around the position where the user is standing. That is, the user performs the panoramic shooting by turning the digital camera 100 by 9 degrees around the position where the user is standing every 0.1 second after the panoramic shooting is started. The digital camera 100 of the first embodiment displays, on the liquid crystal display 170, the target which serves as a standard (indicator) of the turning speed and turning direction for the user who is panning the digital camera 100 so that the user can perform appropriate panoramic shooting. The operation will be described in order below.

When the power supply of the digital camera 100 is switched ON, the controller 150 supplies power to the respective components for initial startup. As a result, the optical system 110, the CMOS image sensor 120, and the like become ready for shooting. When the components become ready for shooting, the controller 150 controls the liquid crystal display 170 to display a generated image (the through image). FIG. 4A is a diagram illustrating an example of screen display of the liquid crystal display 170 which is displaying a through image. As illustrated in FIG. 4A, the through image is displayed on the liquid crystal display 170 so that the user can confirm the angle of view of currently shot image on the liquid crystal display 170.

The shooting mode of the digital camera 100 is set to the panoramic shooting mode by the user to perform the panoramic shooting (S300). In response to the setting of the panoramic shooting mode, the controller 150 draws a fixed frame 250 on the through image displayed by the liquid crystal display 170 (S301). FIG. 4B is a diagram illustrating an example of screen display of the liquid crystal display 170 on which the fixed frame 250 is drawn together with the through image. As illustrated in FIG. 4B, the controller 150 draws the fixed frame 250 to clearly indicate to the user a position on the through image where an optical axis center of the optical system 110 is positioned. Specifically, the fixed frame 250 is a cross-shaped frame and is drawn so that the optical axis center of the optical system 110 is positioned at the crossing of the fixed frame 250. The fixed frame 250 clearly indicates the position on the through image where the optical axis center of the optical system 110 is positioned. As a result, with the fixed frame 250, the user can understand easily the position on the shooting angle of view where the optical axis center of the optical system 110 is positioned.

In FIG. 4B, the horizontal line of the fixed frame 250 indicates an axis in the X direction and the vertical line of the fixed frame 250 indicates an axis in the Y direction. On the horizontal line of the fixed frame 250, the rightward direction is the positive in the X direction and the leftward direction is the negative in the X direction. On the vertical line of the fixed frame 250, the upward direction is the positive in the Y direction and the downward direction is the negative in the Y direction. The crossing of the horizontal line and the vertical line is the position at the coordinates 0.

When the panoramic shooting mode is set and the fixed frame 250 is drawn on the screen of the liquid crystal display 170, the controller 150 starts monitoring the release button 200 for a press operation (S302). Until the user presses the release button 200, the controller 150 stays in a standby state without performing a shooting operation (NO at S302). When the press operation of the release button 200 by the user is accepted (YES at S302), the controller 150 draws the target on the through image displayed by the liquid crystal display 170 (S303). FIG. 4C illustrates an example of a target 260 drawn on the through image displayed on the liquid crystal display 170. As illustrated in FIG. 4C, in order to perform appropriate panoramic shooting, the controller 150 draws the target 260 at a position on the screen of the liquid crystal display 170 on which the fixed frame 250 is to be positioned. Details of the display control of the target 260 on the screen of the liquid crystal display 170 by the controller 150 will be described later. Since the target 260 is drawn at the position on the screen on which the fixed frame 250 is to be positioned, the user can easily perform an operation for moving a casing of the digital camera 100 to position the fixed frame 250 on the display position of the target 260.

The present embodiment is adapted to display the target 260 when the release button 200 is pressed during setting of the panoramic shooting mode instead of the timing of setting of the panoramic shooting mode. In response to the moving operation of the digital camera 100 performed while the target 260 is displayed, the panoramic shooting is started. Accordingly, the user can easily determine whether the user is allowed to start the panoramic shooting or not by determining whether the target 260 is displayed (see FIG. 4C) or not (see FIG. 4B) when the panoramic shooting mode is set.

When the fixed frame 250 and the target 260 are drawn on the screen of the liquid crystal display 170, the controller 150 starts monitoring shake of the casing of the digital camera 100 (S304). In that case, the controller 150 is monitoring a gyro signal with respect to the direction (the pitching direction or the yawing direction) of shake of the casing of the digital camera 100 and the angular velocity output from the gyro sensor 185.

Specifically, in the operation at step S304, the controller 150 compares a value indicated by the obtained gyro signal with a predetermined value. If the value indicated by the obtained gyro signal is lower than the predetermined value, the controller 150 determines that the moving operation (shake) of the casing of the digital camera 100 is not performed by the user (NO at S304). If the value indicated by the obtained gyro signal is higher than the predetermined value, the controller 150 determines that the moving operation (shake) of the casing of the digital camera 100 has been performed by the user (YES at S304). Here, the controller 150 compares the value indicated by the gyro signal with the predetermined value for the purpose of preventing misidentification of an angular velocity resulting from a mere camera shake made by the user as the moving operation of the casing performed by the user.

When the controller 150 determines that the moving operation (shake) on the casing of the digital camera 100 has been performed by the user (YES at S304), it starts the panoramic shooting operation (S305). When a predetermined time has passed after starting the panoramic shooting, the controller 150 finishes the panoramic shooting.

During the panoramic shooting, the CMOS image sensor 120 generates a plurality of images for panorama image synthesis. When the panoramic shooting finishes, the image processor 130 performs panorama image synthesis processing by using the plurality of images for panorama image synthesis generated during the panoramic shooting. The image processor 130 supplies the controller 150 with the panoramic image acquired by the panorama image synthesis processing. The controller 150 creates an image file for the supplied panoramic image according to a predetermined file system. Then, the controller 150 records the created image file of the panoramic image onto the memory card 192. With the above described operation, the controller 150 has completed the panoramic shooting, the panoramic synthesis processing, and the image recording processing.

In the panoramic shooting operation, the controller 150 performs the display control of the target 260 to be drawn on the screen of the liquid crystal display 170 in parallel with the panoramic shooting processing. Details of the display control of the target 260 to be drawn on the screen of the liquid crystal display 170 and the panoramic shooting operation will be described below.

[1-2-1. Display Control of Target]

Figure 5:
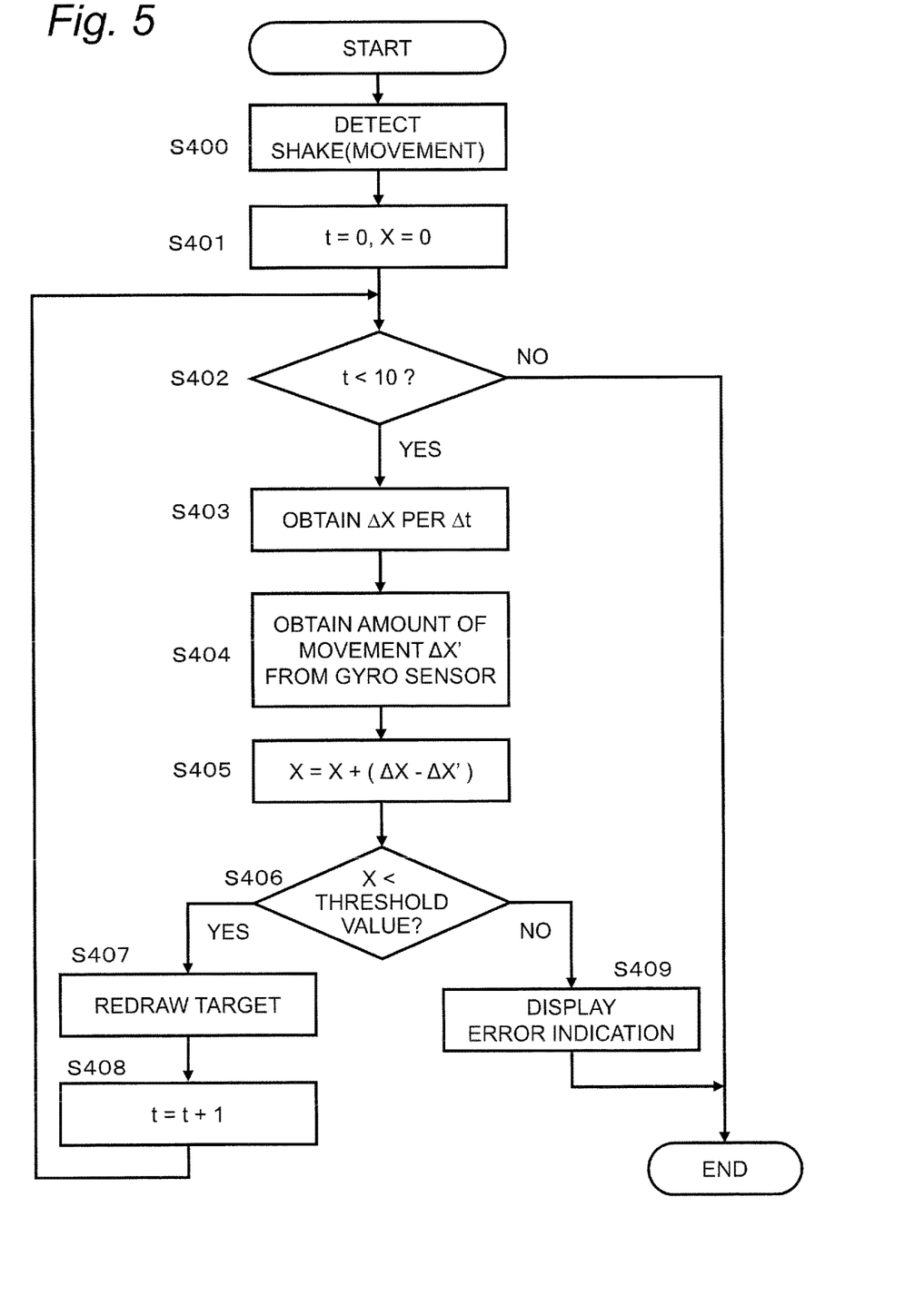
FIG. 5 is a flow chart describing display control in the panoramic shooting mode in the first embodiment.

First, the display control of the target 260 to be drawn on the screen of the liquid crystal display 170 will be described with reference to FIG. 5 and FIGS. 6A to 6D. FIG. 5 is a flow chart describing the display control in the panoramic shooting mode in the first embodiment. FIGS. 6A to 6D are diagrams illustrating the target display control in the panoramic shooting mode in the first embodiment.

When the controller 150 determines that the shake (movement) of the casing of the digital camera 100 has occurred (S400), it starts a target display control operation in the panoramic shooting mode. Step S400 corresponds to the processing performed when it is determined YES at step S304 in the flow chart of FIG. 3.

The controller 150 maintains the time elapsed after starting the panoramic shooting as a variable t and the coordinate of the target 260 in the X direction when the coordinate of the crossing of the fixed frame 250 is 0 as a variable X. When it is determined that the shake of the casing of the digital camera 100 has occurred, the controller 150 resets the values of the variable t and the variable X to 0 (S401).

The controller 150 stores and recognizes the time between the start and finish of the panoramic shooting in a memory of the controller 150 as a predetermined time (in this example, 1 second). The controller 150 maintains the predetermined time (1 second) at 10 intervals. Therefore, the controller 150 also increments the variable t correspondingly to the intervals. The controller 150 compares the variable t with a threshold value (in this example, 10) indicating that the predetermined time (1 second) has passed (S402). If the variable t is equal to or more than 10 (NO at S402), it is determined that the shooting time (1 second) required for the panoramic shooting has elapsed. As a result, the controller 150 finishes the operation. On the other hand, if the variable t is less than 10 (YES at step S402), it is required to continue the panoramic shooting, therefore, the controller 150 moves the operation to step S403.

Subsequently, the controller 150 calculates a variation ΔX of the casing of the digital camera 100 on the screen per unit time Δt (S403). In the embodiment, the user needs to turn the digital camera 100 by 9 degrees per unit time Δt (1 interval) to perform appropriate panoramic shooting. Therefore, the controller 150 calculates a unit variation ΔX corresponding to the turning of 9 degrees. As described above, the liquid crystal display 170 has 720 horizontal dots and the viewing angle of 120 degrees. Accordingly, as a result of proportional calculation, the turning of 9 degrees corresponds to 54 dots on the liquid crystal display 170. That is, the controller 150 finds that the unit variation ΔX is 54 dots by the proportional calculation. A sign of the unit variation ΔX is set to positive when the direction of movement of the camera for shooting a panoramic image is rightward, and is set to negative when the direction of movement is leftward.

Next, the controller 150 calculates a real amount of movement (an amount of rotation) ΔX' of the digital camera 100 per unit time Δt based on the gyro signal obtained from the gyro sensor 185 (S404). The output from the gyro sensor 185 is information on the angular velocity. Therefore, the controller 150 obtains the amount of movement (the amount of rotation) by performing integration processing on the output result from the gyro sensor 185. As in the case of calculating the unit variation ΔX, the controller 150 calculates the number of dots on the liquid crystal display 170 corresponding to the amount of movement by a proportional calculation.

Next, the controller 150 calculates the coordinate X on which the target is to be drawn based on the expression below (S405):

$$X = X + (\Delta X - \Delta X') \quad (1)$$

According to the expression (1), when the panoramic shooting is started but the user does not perform the turning operation of the casing of the digital camera 100, the value of ΔX' does not increase and only the value of ΔX keeps increasing as the time passes after the start of the panoramic shooting. Therefore, under the above described conditions, the coordinate X on which the target is to be drawn keeps increasing. On the other hand, when the panoramic shooting is started and then the user performs the turning operation of the casing of the digital camera 100, the value of ΔX' keeps increasing and also the value of ΔX keeps increasing as the time passes after the start of the panoramic shooting. Therefore, when the user keeps performing the turning operation of the casing of the digital camera 100 to offset the value of ΔX which keeps increasing as the time passes after the start of the panoramic shooting, the coordinate X on which the target 260 is to be drawn approaches 0.

Figure 6A:
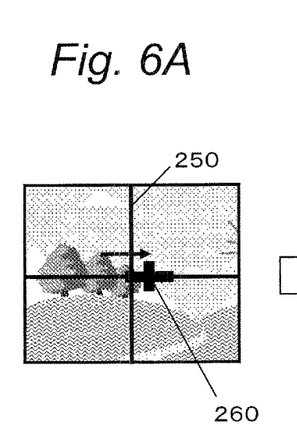
FIGS. 6A, 6B, 6C and 6D are diagrams illustrating display control of a target (which is an indicator showing a moving speed or a direction in a turning operation) in the panoramic shooting mode in the first embodiment.
Figure 6B:
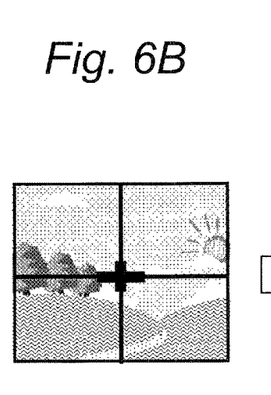
Figure 6C:
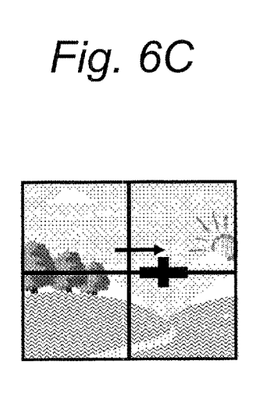
Figure 6D:
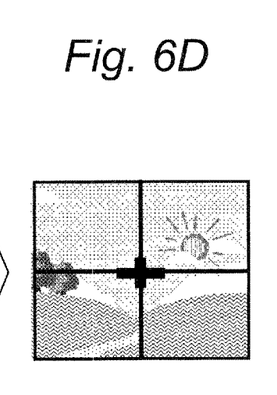

FIGS. 6A to 6D are diagrams illustrating the display control of the target 260 in the panoramic shooting mode in the first embodiment. FIGS. 6A to 6D illustrate examples of the case where the user performs the panoramic shooting by moving the casing of the camera 100 rightward. As illustrated in FIG. 6A, when the panoramic shooting is started, the target 260 moves rightward according to the time change. The user performs the moving operation of the casing of the digital camera 100 rightward to position the moving target 260 on the crossing of the fixed frame 250. As a result, the image is displayed as illustrated in FIG. 6B. As far as the panoramic shooting is continued, the target 260 moves according to the time change as illustrated in FIG. 6C. In association with the movement, the user performs the moving operation of the casing of the digital camera 100 to position the crossing of the fixed frame 250 on the moving target 260. As a result, the image is displayed as illustrated in FIG. 6D. By moving the casing of the digital camera 100 like that, the user can realize appropriate movement of the casing (the appropriate moving speed or appropriate amount of movement) for the panoramic shooting.

Subsequently, the controller 150 determines whether the value of X calculated by the expression (1) is within a predetermined threshold value (S406). If the calculated value of X is the predetermined value or more (NO at S406), the controller 150 controls the liquid crystal display 170 to display an error indication (S409). This is because the fact that the value of the coordinate X of the target has exceeded the predetermined value means that the user fails in performing the appropriate turning operation of the digital camera 100, and therefore, the user cannot perform the appropriate panoramic shooting. On the other hand, if the calculated value of X is within the predetermined value (YES at S406), the controller 150 redraws the target 260 on the liquid crystal display 170 according to the calculated value of X (S407).

Figure 7A:
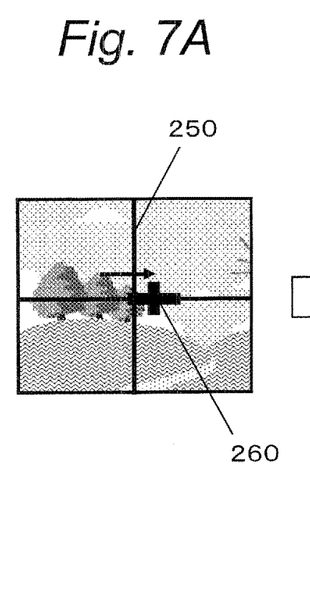
FIGS. 7A, 7B, 7C and 7D are diagrams illustrating an error indication in the panoramic shooting mode in the first embodiment.
Figure 7B:
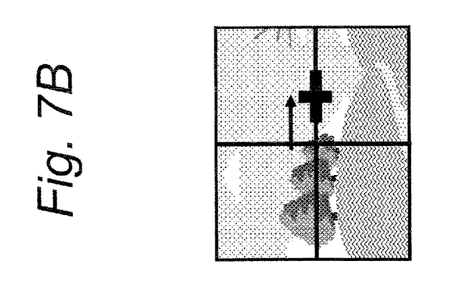
Figure 7C:
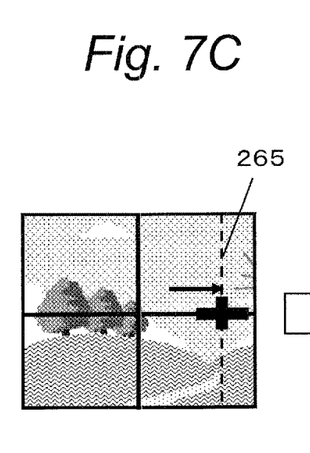
Figure 7D:
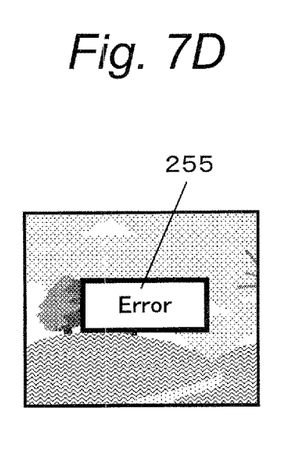

Now, an example of error indication will be described. FIGS. 7A to 7D are diagrams illustrating an error indication in the panoramic shooting mode in the first embodiment. As illustrated in FIG. 7A, when the panoramic shooting is started, the target 260 moves according to the time change. In the case where the user does not perform an operation for moving the casing of the digital camera 100 or performs an operation for moving the casing of the digital camera 100 too fast or too slow with respect to the moving target 260, the display position of the target 260 moves to the end of the liquid crystal display 170 as illustrated in of FIG. 7B and FIG. 7C. When the display position of the target 260 reaches a threshold value line 265 on the liquid crystal display 170 as illustrated in FIG. 7C, the controller 150 determines that the panoramic shooting is failed and displays the error indication as illustrated in FIG. 7D.

Returning to the flow chart of FIG. 5, when the controller 150 finishes redrawing of the target 260, it increments the variable t by 1 (S408). Then, the controller 150 returns to step S402 and repeats the operation from step S402 to step S408 until it is determined that the variable t is increased to 10 or more.

As described above, the controller 150 controls the display position of the target 260 displayed on the liquid crystal display 170 based on the time passed after the panoramic shooting is started and the gyro signal (the angular velocity of the rotation) obtained from the gyro sensor 185. As a result, the controller 150 can display the indicator (the target 260) of the speed at which the user is to perform the turning operation of the casing of the digital camera 100 in order to perform appropriate panoramic shooting. Accordingly, the user can easily perform the panoramic shooting.

Although it is assumed that the rotation angle of the panoramic shooting is 90 degrees and the time required to perform the panoramic shooting spanning 90 degrees is 1 second (at 10 intervals) in the above description, the present disclosure is not limited to them. Changes of design may be made with respect to the rotation angle of the panoramic shooting and the time (intervals) required to perform the panoramic shooting as required according to the specifications of the controller 150 and the image processor 130.

[1-2-2. Panoramic Shooting Operation]

Figure 8:
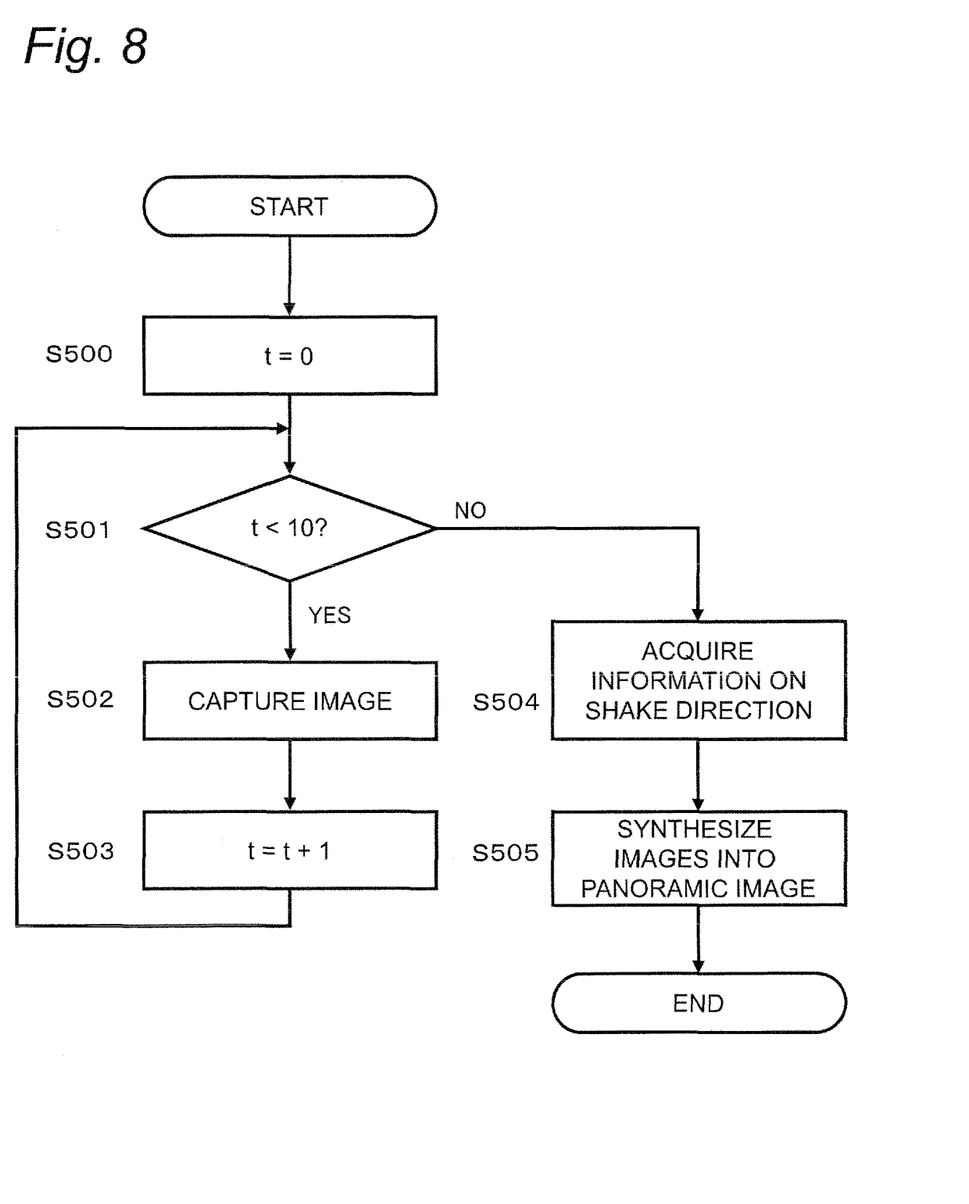
FIG. 8 is a flow chart describing a panoramic shooting operation of the panoramic shooting mode in the first embodiment.

The panoramic shooting operation of the digital camera 100 will be described with reference to FIG. 8. FIG. 8 is a flow chart describing the panoramic shooting operation in the panoramic shooting mode according to the first embodiment.

When the controller 150 determines that the shake (movement) of the casing of the digital camera 100 has occurred, it resets the variable t to 0 to start the panoramic shooting (S500). Step S500 corresponds to step S401 which has been described by using FIG. 5.

As described above, the controller 150 stores and recognizes the time between the start and finish of the panoramic shooting in the memory of the controller 150 as the predetermined time (in this example, 1 second). The controller 150 maintains the predetermined time (1 second) at 10 intervals. The controller 150 compares the variable t with a threshold value (in this example, 10) indicating that the predetermined time (1 second) has passed (S501). If the variable t is less than 10 (YES at step S501), the controller 150 moves the control to step S502 to continue the panoramic shooting.

The controller 150 controls the CMOS image sensor 120 and the image processor 130 to capture an image for generating a panoramic image (S502). When the controller 150 finishes capturing an image for generating a panoramic image, it increments the variable t by 1 (S503). Then, the controller 150 returns to step S501 and repeats the operation from step S502 to step S503 until it is determined that the variable t is increased to 10 or more. As a result, the digital camera 100 can acquire a plurality of images required for synthesizing a panoramic image.

On the other hand, when the variable t is increased to 10 or more (NO at step S501), the controller 150 acquires information on the direction into which the user has shaken the casing of the digital camera 100 at the start of the panoramic shooting (S504). At the start of the panoramic shooting, the controller 150 acquires information indicating whether the casing of the digital camera 100 is shaken by the user in the pitching direction or the yawing direction based on the output from the gyro sensor 185, and saves the information in the memory of the controller 150. By acquiring the direction into which the user has shaken the casing of the digital camera 100, the controller 150 can figure out an orientation into which the controller 150 should synthesize the plurality of images which have been captured as materials to be synthesized into a panoramic image.

According to the information indicating the shake direction acquired at step S504, the controller 150 instructs the image processor 130 to synthesize the plurality of images which have been captured as materials to be synthesized into a panoramic image (S505). The image processor 130 performs synthesis of a panoramic image according to the instruction from the controller 150. If the shake direction acquired at step S504 is rightward (the yawing right direction), the image processor 130 synthesizes the plurality of captured images by arranging the images from left to right in the capturing order. In the panoramic image synthesis processing, the image processor 130 may synthesize the images by arranging the adjacent images to partially overlap or by arranging the adjacent images not to overlap.

[2. Summarization]

As described above, when the panoramic shooting is started, the digital camera 100 of the embodiment starts capturing a plurality of images which are to be used as materials synthesized into a panoramic image while performing the display control of the target 260 drawn on the liquid crystal display 170. According to the time passed after the panoramic shooting is started, the controller 150 shifts a prescribed position at which the target 260 is to be drawn in the direction of shake of the casing at the start of the panoramic shooting (the direction of movement). On the other hand, according to the output result from the gyro sensor 185 made in association with the turning operation of the casing by the user, the controller 150 intends to shift the prescribed position at which the target 260 is to be drawn in the direction opposite to the shake direction (in the direction toward the origin position of the fixed frame 250). As a result, the digital camera 100 can precisely indicate, to the user, the speed of the turning operation of the casing in order to perform appropriate panoramic shooting, therefore, the user can easily perform appropriate panoramic shooting.

Other Embodiments

The first embodiment has been described above as an example of the technology disclosed in the present application. However, the technology in the present disclosure is not limited to that embodiment and may also be applied to embodiments which are subjected to modification, substitution, addition, or omission as required. Then, other embodiments will be exemplified below.

In the above described embodiment, the timing of starting the panoramic shooting is assumed to be the time when a shake of the casing of the digital camera 100 by the user is detected. By configuring the embodiment to start the panoramic shooting when a shake of the casing is detected, the embodiment has an advantage of allowing the user to be easily informed of the start of the panoramic shooting as the operational feeling. However, the timing of starting the panoramic shooting may be the time when the shutter button is pressed. Alternatively, the timing of starting the panoramic shooting may be the time after the elapse of a predetermined time after the shutter button is pressed (in this case, the countdown to the timing may be displayed).

In the above described embodiment, it is assumed that the direction of the panoramic shooting is set based on the direction into which the user has shaken the casing of the digital camera 100. By configuring the embodiment to specify the direction into which the user has shaken the casing of the digital camera 100 as the direction of the panoramic shooting, the embodiment has an advantage of allowing the user to be easily informed of the direction of the panoramic shooting as the operational feeling. However, the present disclosure is not limited to that and the direction of the panoramic shooting may be set previously by the user before pressing the shutter button. Alternatively, a certain direction may be previously decided as the direction of the panoramic shooting at manufacturing time of the digital camera 100 instead of being set by the user.

Figure 9:
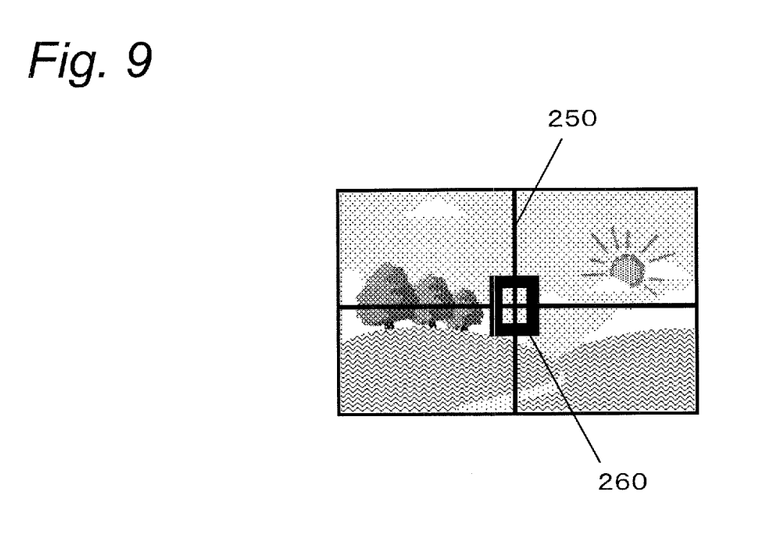
FIG. 9 is a diagram illustrating another example of display of the target in the panoramic shooting mode in another embodiment.

Although the target 260 is assumed to be in a cross shape in the above described embodiment, the present disclosure is not limited to that. For example, the target 260 may be in a frame shape (round frame, triangle frame, square frame, etc.) as illustrated in FIG. 9. In the case where the target 260 is in a frame shape, the user performs the panoramic shooting by positioning the intersection point of the fixed crossing in the frame. In the case where the target 260 is in a cross shape, the user positions the fixed frame 250 on the point of the target 260, in which case the user is allowed to easily position the fixed frame 250 on the target 260 precisely. On the other hand, in the case where the target 260 is in a frame shape, the user is allowed to position the intersection point of the fixed frame 250 in the target 260 with likelihood, in which case the user is allowed to easily position the fixed frame 250 on the target 260.

Although the error indication is displayed when the target 260 moves in the X direction over the threshold value in the above described embodiment, the error indication may also be displayed in the Y direction. In that case, the error indication may be displayed when the amount of movement in the Y direction after the start of the panoramic shooting exceeds a predetermined threshold value. As a result, the present disclosure can notify the user of the failure of the panoramic shooting caused by the user shaking the casing in the Y direction during the panoramic shooting in the X direction.

Although the fixed frame 250 is drawn in a cross shape so that the intersection point of the fixed frame 250 is positioned on the center of the optical axis of the optical system 110 in the example illustrated in FIG. 4B in the above described embodiment, the fixed frame is not limited to that. The fixed frame 250 may be in other shapes such as a dot shape as far as the shape clearly indicates the position on the through image where the optical axis center of the optical system 110 is. Further, the fixed frame 250 needs not to clearly indicate the position on the through image where the optical axis center of the optical system 110 is, and may be positioned anywhere on the screen. That is, the fixed frame 250 may be any frame as far as it is fixedly displayed somewhere on the through image regardless of the moving operation of the digital camera 100.

Although the fixed frame 250 and the target 260 in the panoramic shooting are displayed in the above described embodiment, the present disclosure is not limited to them. That is, the display control of the fixed frame and the target disclosed in the above described embodiment may be applied to an imaging apparatus which shoots an image by moving the casing in a predetermined direction as in the panoramic shooting. For example, the display control may also be applied to the imaging apparatus which has a 3D shooting mode for successively capturing a plurality of images by moving the casing of the digital camera in a predetermined direction and generating a 3D image by using some of the plurality of images.

Although the information on movement of the imaging apparatus (the digital camera 100) is detected by the gyro sensor 185 in the above described embodiment, the present disclosure is not limited to that. For example, the information on movement of the imaging apparatus may be detected by the image processor 130 which analyzes a captured image of each frame and computes the amount of movement of the subject instead of using the gyro sensor 185. That is, other configurations and methods which can detect the information on movement of the imaging apparatus may be used.

INDUSTRIAL APPLICABILITY

The present disclosure can be applied to an imaging apparatus which shoots an image by moving the casing in a predetermined direction as in the panoramic shooting. Specifically, the present disclosure can be applied to imaging apparatuses such as a digital still camera, a movie camera with still shooting function, a camera-equipped information terminal, and a camera-equipped game console.

What is claimed is:

1. An imaging apparatus which has a panoramic shooting mode for shooting an image by moving the imaging apparatus in a predetermined shooting direction, the imaging apparatus comprising:
    an imaging device including an image sensor configured to capture a subject image to generate image data;
    a display device configured to display an image based on the generated image data;
    a timer configured to detect an elapsed time after shooting of the image is started in the panoramic shooting mode;
    a sensor configured to detect an amount of movement of the imaging apparatus in the predetermined shooting direction; and
    a processor configured to control the display device to display in the panoramic shooting mode a first indicator fixedly positioned on the display device and a second indicator movably positioned on the display device, the second indicator indicating a target speed or a target amount of movement in the predetermined shooting direction, wherein:
    the processor updates a display position of the second indicator comprising:
        calculating a first amount of movement in the predetermined shooting direction according to the elapsed time and a predetermined amount of movement for a duration of time;
        calculating a second amount of movement in a direction opposite to the predetermined shooting direction according to the amount of movement during the elapsed time as detected by the sensor, and
        controlling the display position of the second indicator based on the difference between the first amount of movement and the second amount of movement.

2. The imaging apparatus according to claim 1, wherein in the panoramic shooting mode, the shooting of the image is started when the movement of the imaging apparatus is detected by the sensor.

3. The imaging apparatus according to claim 1, wherein the predetermined shooting direction is decided based on the direction of movement of the imaging apparatus detected by the sensor.

4. The imaging apparatus according to claim 1, wherein the panoramic shooting mode is a mode for generating a 3D image.

5. The imaging apparatus according to claim 1, wherein the processor controls the display device to display an error indication when the display position of the difference between the first amount of movement and the second amount of movement is not within a predetermined region.

6. The imaging apparatus according to claim 1, wherein the sensor comprises a gyro sensor.

* * * * *